(12) United States Patent
Bibette et al.

(10) Patent No.: US 9,637,601 B2
(45) Date of Patent: *May 2, 2017

(54) METHOD FOR PREPARING A MASTERBATCH OF AN ELASTOMER AND AN INORGANIC REINFORCING FILLER

(75) Inventors: Jérôme Bibette, Paris (FR); Fernando Martinez Pedrero, Madrid (ES); Benoît De Gaudemaris, Clermont-Ferrand (FR); Julien Berriot, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 188 days.

This patent is subject to a terminal disclaimer.

(21) Appl. No.: 14/111,756

(22) PCT Filed: Dec. 21, 2011

(86) PCT No.: PCT/EP2011/073666
§ 371 (c)(1),
(2), (4) Date: Jul. 24, 2014

(87) PCT Pub. No.: WO2012/139669
PCT Pub. Date: Oct. 18, 2012

(65) Prior Publication Data
US 2015/0267008 A1    Sep. 24, 2015

(30) Foreign Application Priority Data

Apr. 15, 2011 (FR) ........... 11 53316

(51) Int. Cl.
| C08J 3/215 | (2006.01) |
| C08J 3/22  | (2006.01) |
| B60C 1/00  | (2006.01) |
| C08C 1/15  | (2006.01) |
| C08L 21/00 | (2006.01) |
| C08K 3/00  | (2006.01) |
| C08K 9/06  | (2006.01) |

(52) U.S. Cl.
CPC ............ *C08J 3/226* (2013.01); *B60C 1/0016* (2013.04); *C08C 1/15* (2013.01); *C08J 3/215* (2013.01); *C08K 3/0033* (2013.01); *C08L 21/00* (2013.01); *C08J 2307/02* (2013.01); *C08J 2409/00* (2013.01); *C08J 2421/00* (2013.01); *C08K 9/06* (2013.01)

(58) Field of Classification Search
CPC .................... C08J 3/215; C08J 3/226
USPC .......................................... 523/351
See application file for complete search history.

(56) References Cited

U.S. PATENT DOCUMENTS

| 5,763,388 A | 6/1998 | Lightsey et al. |
| 2003/0114571 A1* | 6/2003 | Pan ............ B60C 1/0016 524/492 |
| 2010/0022684 A1 | 1/2010 | Wallen et al. |

FOREIGN PATENT DOCUMENTS

| CN | 1197084 | 10/1998 |
| CN | 1352592 A | 6/2002 |
| CN | 1405222 A | 3/2003 |
| EP | 0849320 | 6/1998 |
| EP | 1834980 A1 | 9/2007 |
| JP | 2007-224067 * | 9/2007 |
| WO | 0062990 | 10/2000 |
| WO | 0110946 A2 | 2/2001 |

OTHER PUBLICATIONS

Chinese Office Action on Application No. 201180071021.7 dated Feb. 11, 2015.
U.S. Pat. No. 6,841,606 B2; Issued Jan. 11, 2005; Assignee: Bridgestone Corporation—English Translation of CN 1405222.

* cited by examiner

Primary Examiner — Edward Cain
(74) Attorney, Agent, or Firm — Dickinson Wright PLLC

(57) ABSTRACT

The invention relates to a process for the preparation of a masterbatch of diene elastomer and reinforcing inorganic filler in accordance with the invention comprises the following successive stages:
bringing into contact and mixing one or more aqueous dispersions (B) of one or more hydrophobized reinforcing inorganic fillers, which coagulate(s) spontaneously with the said latex, and one or more diene elastomer latexes (A) in order to obtain a coagulum, without requiring a coagulating agent,
recovery of the coagulum, then
drying the recovered coagulum in order to obtain the masterbatch.

24 Claims, No Drawings

METHOD FOR PREPARING A MASTERBATCH OF AN ELASTOMER AND AN INORGANIC REINFORCING FILLER

CROSS-REFERENCE TO PRIOR APPLICATIONS

This application claims the benefit of the filing date of PCT Application No. PCT/EP2011/073666, filed Dec. 21, 2011, which claims the benefit of the filing date of the French application no. 1153316, filed Apr. 15, 2011, each document being incorporated by reference in its entirety.

The invention relates to the preparation of a masterbatch of diene elastomer and of reinforcing inorganic filler comprising a diene elastomer latex, in particular a natural rubber latex, and at least one reinforcing inorganic filler which spontaneously coagulates with the said latex.

The term "masterbatch" is understood to mean an elastomer-based composite into which a filler and optionally other additives has/have been introduced.

The present invention relates in particular to the use of such a masterbatch in the manufacture of diene rubber compositions reinforced with an inorganic filler which are intended for the manufacture of tyres or of semifinished products for tyres, in particular of treads of these tyres.

It is known that, in order to obtain the optimum reinforcing properties conferred by a filler in a tyre tread and thus a high wear resistance, it is advisable generally for this filler to be present in the elastomeric matrix in a final form which is both as finely divided as possible and as homogeneously distributed as possible. In point of fact, such conditions can only be achieved in so far as this filler exhibits a very good ability, on the one hand, to be incorporated in the matrix during the mixing with the elastomer and to deagglomerate and, on the other hand, to disperse homogeneously in this matrix.

In a known way, carbon black exhibits such abilities, which is generally not the case with inorganic fillers, in particular silicas. This is because, for reasons of reciprocal affinities, these inorganic filler particles have an unfortunate tendency, in the elastomer matrix, to agglomerate with one another. These interactions have the harmful consequence of limiting the dispersion of the filler and thus the reinforcing properties to a level substantially below that which it would be theoretically possible to achieve if all the bonds (inorganic filler/elastomer) capable of being created during the mixing operation were actually obtained; these interactions tend, moreover, to increase the consistency in the raw state of rubber compositions and thus to render their processability more difficult than in the presence of carbon black.

Ever since savings in fuel and the need to protect the environment have become a priority, it has proved necessary to produce tyres having a reduced rolling resistance without having a disadvantageous effect on their wear resistance.

This has been made possible in particular by virtue of the use, in the treads of these tyres, of novel rubber compositions reinforced with inorganic fillers, especially with specific silicas of the highly dispersible type, capable of competing, from the reinforcing viewpoint, with a conventional tyre-grade carbon black, while giving these compositions a lower hysteresis, synonymous with a lower rolling resistance for the tyres comprising them, and an improved grip on wet, snowy or icy ground.

Treads filled with such highly dispersible silicas (denoted "HD" or "HDS" for "highly dispersible" or "highly dispersible silica"), which can be used in tyres having a low rolling resistance, sometimes described as "Green Tyres" for the energy saving offered to the user ("Green Tyre concept"), have been extensively described. Reference will in particular be made to Patent Applications EP 501 227, EP 692 492, EP 692 493, EP 735 088, EP 767 206, EP 786 493, EP 881 252, WO99/02590, WO99/02601, WO99/02602, WO99/06480, WO00/05300 and WO00/05301.

These documents of the prior art teach the use of silicas of the HD type exhibiting a BET specific surface of between 100 and 250 $m^2/g$. In practice, an HD silica having a high specific surface acting as reference in the field of "Green Tyres" is in particular the silica "Zeosil 1165 MP" (BET surface equal to approximately 160 $m^2/g$), sold by Rhodia. The use of this "Zeosil 1165 MP" silica makes it possible to obtain good compromises as regards tyre performance, in particular a satisfactory wear resistance and a satisfactory rolling resistance.

The advantage of using a silica having a high specific surface lies mainly in the possibility of increasing the number of bonds of the silica with the elastomer and thus of increasing the level of reinforcement of the latter. This is why it appears advantageous to use, in rubber compositions for tyre treads, silicas having a high specific surface, possibly greater than that conventionally used of the order of 160 $m^2/g$, in order in particular to improve the wear resistance of these treads. Nevertheless, the dispersibility of the filler and the increase in its specific surface are regarded as contradictory characteristics. This is because a high specific surface supposes an increase in the interactions between filler items and thus a poor dispersion of the filler in the elastomer matrix and also a difficult processability.

Another type of solution has been envisaged which consists, in order to improve the dispersibility of the filler in the elastomer matrix, in mixing the elastomer and the filler in the "liquid" phase. To do this, recourse has been had to an elastomer in the latex form which is provided in the form of elastomer particles dispersed in water and to an aqueous dispersion of the filler, that is to say a silica dispersed in water, commonly referred to as slurry. However, bringing the elastomer latex and the slurry into contact does not make it possible to have coagulation within the liquid medium, which coagulation should make it possible to obtain a solid which, after drying, results in the achievement of the desired masterbatch of elastomer and silica.

This is because silica aggregates are typically hydrophilic in nature and have an affinity with water; thus, silica aggregates have more affinity with water than with the elastomer particles themselves.

Various solutions have been provided in order to make it possible nevertheless to obtain this coagulation and good dispersion of the filler in the elastomer matrix in the "liquid" phase by the combined use of an agent which makes it possible to increase the affinity between the elastomer and the silica, such as a coupling agent, and of an agent which makes it possible to carry out the solidification and thus the coagulation, known as coagulating agent.

Thus, for example, U.S. Pat. No. 5,763,388 provides for the incorporation of silica in the rubber latex by treating the silica with a coupling agent, the silica thus treated being mixed in the presence of conventional coagulating agents.

Patent EP 1 321 488 also intends to bring an aqueous dispersion with negatively charged silica and a diene elastomer latex into contact with an emulsion comprising a polysulphide coupling agent, in the presence of a coagulating agent, such as a polyamine.

The Applicant Companies have discovered, surprisingly, a process for the preparation of a silica/elastomer masterbatch prepared in the "liquid" phase without using a coagulating agent.

The process for the preparation of a masterbatch of diene elastomer and reinforcing inorganic filler in accordance with the invention comprises the following successive stages:

bringing into contact and mixing one or more aqueous dispersions (B) of one or more hydrophobized reinforcing inorganic fillers, which coagulate(s) spontaneously with the said latex, and one or more diene elastomer latexes (A) in order to obtain a coagulum, without requiring a coagulating agent, recovery of the coagulum, then drying the recovered coagulum in order to obtain the masterbatch.

The invention also relates to a masterbatch of diene elastomer and of filler prepared according to the process described above.

Another subject-matter of the invention is a rubber composition based on at least one masterbatch of diene elastomer and of filler prepared according to the process described above, a finished or semifinished article comprising a composition as defined above and a tyre tread comprising a composition as defined above.

Finally, a subject-matter of the invention is a tyre or semifinished product comprising at least one rubber composition as defined above.

Other subject-matters, characteristics, aspects and advantages of the invention will become even more clearly apparent on reading the description and examples which follow.

Diene Elastomer Latex (A)

Elastomer in the latex form is understood to mean, within the meaning of the present invention, an elastomer provided in the form of elastomer particles dispersed in water.

The invention relates to diene elastomer latexes, the diene elastomers being defined as follows:

"Diene" elastomer or rubber should be understood as meaning, in a known way, an elastomer resulting at least in part (i.e., a homopolymer or a copolymer) from diene monomers (monomers carrying two carbon-carbon double bonds which may or may not be conjugated).

These diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content of units of diene origin, always less than 15%). In the category of "essentially unsaturated" diene elastomers, "highly unsaturated" diene elastomer is understood to mean in particular a diene elastomer having a content of units of diene origin (conjugated dienes) which is greater than 50%.

Furthermore, among these diene elastomers, a distinction is made between natural rubber and synthetic elastomers.

Natural rubber (NR), which is particularly suitable for the invention, exists in different forms, as described in detail in Chapter 3, "Latex concentrates: properties and composition", by K. F. Gaseley, A. D. T. Gordon and T. D. Pendle, in "Natural Rubber Science and Technology", A. D. Roberts, Oxford University Press, 1988.

In particular, several forms of natural rubber latex are commercially available: natural rubber latexes, referred to as field latexes, concentrated natural rubber latexes, epoxidized latexes (ENR), deproteinized latexes, latexes which have been subjected to an amide bond cleavage stage, or prevulcanized latexes. Field natural rubber latex is a latex to which ammonia has been added in order to prevent premature coagulation and concentrated natural rubber latex corresponds to a field latex which has been subjected to a treatment corresponding to washing, followed by concentration. The various categories of concentrated natural rubber latex are listed in particular in Standard ASTM D 1076-06. Among these concentrated natural rubber latexes, a distinction is made in particular between concentrated natural rubber latexes of HA (high ammonia) grade and those of LA grade; use may advantageously be made, for the invention, of concentrated natural rubber latexes of HA grade.

The latex can be used directly or can be diluted beforehand in water in order to facilitate the use thereof.

Synthetic diene elastomers capable of being used in accordance with the invention diene elastomer is understood to mean more particularly:

(a)—any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d)—a copolymer of isobutene and of isoprene (butyl rubber) and also the halogenated versions, in particular chlorinated or brominated versions, of this type of copolymer.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or also functionalized with a coupling and/or star-branching or functionalization agent. For coupling with carbon black, mention may be made, for example, of functional groups comprising a C—Sn bond or of aminated functional groups, such as aminobenzophenone, for example; for coupling with a reinforcing inorganic filler, such as silica, mention may be made, for example, of silanol or polysiloxane functional groups having a silanol end (such as described, for example, in FR 2 740 778 or U.S. Pat. No. 6,013,718, and WO 2008/141702), of alkoxysilane groups (such as described, for example, in FR 2 765 882 or U.S. Pat. No. 5,977,238), of carboxyl groups (such as described, for example, in WO 01/92402 or U.S. Pat. No. 6,815,473, WO 2004/096865 or US 2006/0089445) or of polyether groups (such as described, for example, in EP 1 127 909 or U.S. Pat. No. 6,503,973, WO 2009/000750 and WO 2009/000752). Mention may also be made, as other examples of functionalized elastomers, of elastomers (such as SBR, BR, NR or IR) of the epoxidized type.

The following are suitable: polybutadienes, in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature (Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between −5° C. and −50° C. In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C., are suitable in particular.

To sum up, the synthetic diene elastomer or elastomers according to the invention are preferably chosen from the group of the highly unsaturated diene elastomers consisting of polybutadienes (abbreviated to "BRs"), synthetic polyisoprenes (IRs), butadiene copolymers, isoprene copolymers and the mixtures of these elastomers. Such copolymers are more preferably chosen from the group consisting of butadiene/styrene copolymers (SBRs), isoprene/butadiene copolymers (BIRs), isoprene/styrene copolymers (SIRs) and isoprene/butadiene/styrene copolymers (SBIRs).

Thus, as synthetic elastomer latex, the latex can in particular consist of a synthetic diene elastomer already available in the emulsion form (for example, a copolymer of butadiene and of styrene, SBR, prepared in emulsion) or of a synthetic diene elastomer initially in solution (for example an SBR prepared in solution) which is emulsified in a mixture of organic solvent and water, generally using a surface-active agent.

A latex of SBR, in particular an SBR prepared in emulsion ("ESBR") or an SBR prepared in solution ("SSBR"), more particularly an SBR prepared in emulsion, is particularly suitable for the invention.

There exists two main types of processes for the emulsion copolymerization of styrene and of butadiene, one of them, or hot process (carried out at a temperature of approximately 50° C.), being suitable for the preparation of highly branched SBRs while the other, or cold process (carried out at a temperature which can range from 15° C. to 40° C.), makes it possible to obtain more linear SBRs.

For a detailed description of the effectiveness of several emulsifiers which can be used in the said hot process (as a function of the contents of the said emulsifiers), reference may be made, for example, to the two papers by C. W. Carr, I. M. Kolthoff and E. J. Meehan, University of Minnesota, Minneapolis, Minn., which appeared in the Journal of Polymer Science in 1950, Vol. V, No. 2, pp. 201-206, and in 1951, Vol. VI, No. 1, pp. 73-81.

As regards comparative examples of implementation of the said cold process, reference may be made, for example, to the paper Industrial and Engineering Chemistry, 1948, Vol. 40, No. 5, pp. 932-937, E. J. Vandenberg and G. E. Hulse, Hercules Powder Company, Wilmington, Del., and to the paper Industrial and Engineering Chemistry, 1954, Vol. 46, No. 5, pp. 1065-1073, J. R. Miller and H. E. Diem, B. F. Goodrich Chemical Co., Akron, Ohio.

In the case of an SBR (ESBR or SSBR) elastomer, use is made in particular of an SBR having a moderate styrene content, for example of between 20% and 35% by weight, or a high styrene content, for example from 35% to 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1,4-bonds.

It should be noted that it is possible to envisage using one or more natural rubber latexes as a blend, one or more synthetic rubber latexes as a blend or a blend of one or more natural rubber latexes with one or more synthetic rubber latexes.

According to a preferred embodiment of the invention, the process employs an aqueous natural rubber dispersion and more particularly a concentrated natural rubber latex and in particular a concentrated natural rubber latex of "HA" (high ammonia) grade or of "LA" grade. More particularly, the concentrated natural rubber latex of "HA" (high ammonia) grade is used.

The concentration of natural rubber in the aqueous dispersion (A) is from 10% to 65% by weight, preferably from 30% to 65% by weight and in particular from 40% to 65% by weight, with respect to the total weight of the dispersion.

Aqueous Dispersion of One or More Reinforcing Inorganic Fillers (B)

Filler is understood to mean, within the meaning of the present invention, the chemical entity which will undergo chemical modification in order subsequently, once modified, to be present in the dispersion (B) and then brought into contact with the aqueous dispersion of diene elastomer latex (A) in order to form the coagulum. Thus, this term denotes only the unmodified chemical entity, such as silica.

"Reinforcing inorganic filler" according to the invention should be understood, in the present patent application, by definition, as meaning any inorganic or mineral filler (whatever its colour and its origin (natural or synthetic)), also known as "white filler", "clear filler" or indeed even "nonblack filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black. In the context of the present invention, such a filler is characterized by its hydrophilic nature, that is to say, generally, in a known way by the presence of hydroxyl (—OH) groups at its surface.

The physical state under which the reinforcing inorganic filler is provided is not important, whether it is in the form of a powder, of microbeads, of granules, of beads or any other appropriate densified form. Of course, reinforcing inorganic filler is also understood to mean mixtures of different reinforcing inorganic fillers, in particular of siliceous and/or aluminous fillers as described below.

Mention may be made, as silica, of precipitated, fumed or colloidal silica. Mention may be made, as inorganic filler, of silica ($SiO_2$), alumina ($Al_2O_3$), alumina monohydrate ($Al_2O_3.H_2O$), aluminum hydroxide [$Al(OH)_3$], aluminum carbonate [$Al_2(CO_3)_3$], magnesium hydroxide [$Mg(OH)_2$], magnesium oxide (MgO), magnesium carbonate ($MgCO_3$), talc ($3MgO.4SiO_2.H_2O$), attapulgite ($5MgO.8SiO_2.9H_2O$), titanium dioxide ($TiO_2$), titanium black ($TiO_{2n-1}$), calcium oxide (CaO), calcium hydroxide [$Ca(OH)_2$], aluminum magnesium oxide ($MgO.Al_2O_3$), clay ($Al_2O_3.2SiO_2$), kaolin ($Al_2O_3.2SiO_2.2H_2O$), pyrophyllite ($Al_2O_3.4SiO_2.H_2O$), bentonite ($Al_2O_3.4SiO_2.2H_2O$), aluminum silicate ($Al_2SiO_5.Al_4(SiO_4)_3.5H_2O$), magnesium silicate ($Mg_2SiO_4.MgSiO_3$), calcium silicate ($Ca_2SiO_4$), aluminum calcium silicate ($Al_2O_3.CaO.2SiO_2$), calcium magnesium silicate ($CaMgSiO_4$), calcium carbonate ($CaCO_3$), zirconium oxide ($ZrO_2$), zirconium hydroxide [$ZrO(OH)_2.nH_2O$], zirconium carbonate [$Zr(CO_3)_2$], and crystalline aluminosilicates comprising atoms of hydrogen compensating for the charges, alkali metals or alkaline earth metals, such as zeolites, and their mixture.

Mineral fillers of the siliceous type, in particular silica ($SiO_2$), or of the aluminous type, in particular alumina ($Al_2O_3$), are suitable in particular as reinforcing inorganic fillers. Preferably, silica is used. The silica used can be any reinforcing silica known to a person skilled in the art, in particular any precipitated or fumed silica exhibiting a BET specific surface and a CTAB specific surface both of less than 450 m$^2$/g, preferably from 30 to 400 m$^2$/g. Mention will be made, as precipitated silicas, for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber and silicas having a high specific surface, such as described in Application WO 03/16837.

According to another embodiment of the invention, the diene elastomer employed is natural rubber and the inorganic filler used is silica.

In contrast to carbon black, the filler employed according to the invention does not coagulate spontaneously with natural rubber. In the specific case of silica, the silica aggregates are typically hydrophilic and have more affinity with the water than with the elastomer particles themselves.

Nevertheless, various solutions have been provided in order to make it possible to obtain the coagulation of the filler in the elastomeric matrix in the liquid phase.

Thus, it is necessary to surface modify the filler according to the invention in order to create the necessary affinity between the filler particles and the elastomer particles. The ability of the filler to coagulate spontaneously with the elastomer, that is to say without requiring a coagulating agent, originates from the surface properties of the said filler.

In point of fact, it has been observed, surprisingly, that bringing the aqueous dispersion (B) of hydrophobized filler into contact with the dispersion (A) of diene elastomer latex results in the formation of a coagulum.

In order to render hydrophobic the filler according to the invention, there is grafted, to the particle, one or more hydrophobing agents of following formula (I):

$$E_n\text{-}F \qquad \text{(Formula I)}$$

in which:

n is an integer equal to 1 or 2, when n has the value 1, then F is a monovalent group, when n has the value 2, then F is a divalent group, E represents a functional group which is capable of bonding physically and/or chemically to the filler and which comprises, in its structure, at least one alkyl or alkylene chain comprising from 1 to 18 carbon atoms which confers hydrophobing properties on the group E, F represents a group which may or may not bond physically and/or chemically to the diene elastomer.

Advantageously, the hydrophobing agent is of following formula (II):

$$[G_{(3-m)}(L\text{-}K)_m Si\text{-}L\text{-}]_n\text{-}F \qquad \text{(II)}$$

with:

when n has the value 1, then F denotes the K group defined below and m varies from 0 to 2, and when n has the value 2, then F denotes an amino group, a polysulphide ($S_x$) group or an epoxy group and m varies from 0 to 2, and for which the G groups are chosen, independently of one another, from a hydrogen atom, a $C_1$-$C_{18}$ hydrocarbon group chosen from linear, branched or cyclic alkyl groups, aralkyl groups, alkylaryl groups and aryl groups, such as a phenyl, a benzyl, a cyclopentyl, a cyclohexyl, an alkoxy ($R_1O$)— group, in which $R_1$ represents a saturated $C_1$-$C_8$ alkyl radical, such as, for example, the methyl, ethyl and isopropyl groups, preferably at least one methyl and ethyl group, a halogen atom, such as fluorine, chlorine, bromine and iodine, and a hydroxyl group, provided that at least one G group is chosen from an alkoxy group, a chlorine atom or a hydroxyl group, L denotes a saturated or unsaturated and linear, branched or cyclic $C_1$-$C_{18}$ alkylene radical, preferably of 1 to 8 carbon atoms, such as, for example, the methylene, ethylene, isopropylene, n-butylene, octadecylene, phenylene, cyclopentylene and cyclohexylene groups, optionally comprising an oxygen atom, K denotes a hydrogen atom, a halogen atom, such as fluorine, chlorine, bromine and iodine, or a functional group chosen from an amino group, a polyaminoalkyl group, a mercapto group, an epoxy group, a hydroxyl group, a vinyl group, an acryloyloxy group, a methacryloyloxy group, an —SCN group or an R(CO)S— group with R being a $C_1$-$C_{18}$ alkyl group.

Preferably, m=0.

Thus, according to a first specific embodiment of the invention, the hydrophobing agent is of following formula (III):

$$G_3Si\text{-}L\text{-}K \qquad \text{(III)}$$

with G, L and K being as defined above.

According to a second specific embodiment of the invention, the hydrophobing agent is of following formula (IV):

$$[G_3Si-L-]_2-F \qquad (IV)$$

with G, L and F being as defined above.

Preferably, the hydrophobing agent is chosen from chlorotrimethylsilane, chlorotriethylsilane, chlorotripropylsilane, bromotrimethylsilane, bromotriethylsilane, bromotripropylsilane, fluorotrimethylsilane, methoxytrimethylsilane, methoxytriethylsilane, methoxytripropylsilane, chlorotrimethylsilane, dichlorodimethylsilane, trichloromethylsilane, bromotrimethylsilane, dibromodimethylsilane, tribromomethylsilane, methoxytrimethylsilane, dimethoxydimethylsilane, trimethoxymethylsilane, tetramethoxysilane, trimethoxypropylsilane, trimethoxyoctylsilane, trimethoxyhexadecylsilane, dimethoxydipropylsilane, triethoxymethylsilane, triethoxypropylsilane, triethoxyoctylsilane, diethoxydimethylsilane, octenyldimethylchlorosilane, octadecyltrichlorosilane, (γ-aminopropyl)trimethoxysilane, (γ-aminopropyl)triethoxysilane, (γ-hydroxypropyl)tripropoxysilane, (γ-mercaptopropyl)triethoxysilane, (γ-aminopropyl)dimethylethoxysilane, (γ-aminopropyl)dihydroxymethoxysilane, (glycidylpropyl)trimethoxysilane, [γ-(N-aminoethyl)aminopropyl]triethoxysilane, (γ-methacryloyloxypropyl)triethoxysilane, (γ-methacryloyloxypropyl)trimethoxysilane, (β-mercaptoethyl)triethoxysilane, [γ-(N-aminoethyl)aminopropyl]trimethoxysilane, (N-methylaminopropyl)trimethoxysilane, (γ-thiocyanatopropyl)triethoxysilane, bis-(3-triethoxythiopropyl) silane tetrasulphide, vinyltriethoxysilane, vinylphenylmethylsilane, vinyldimethylmethoxysilane, divinyldimethoxysilane, divinylethyldimethoxysilane, dimethylvinylchlorosilane and their mixture.

Mention should in particular be made, among the known alkoxysilane polysulphide compounds, of bis(3-triethoxysilylpropyl) tetrasulphide (abbreviated to "TESPT"), of formula $[(C_2H_5O)_3Si(CH_2)_3S_2]_2$, sold in particular by Degussa under the name "Si69", in the form of a commercial mixture of polysulphides $S_x$ with a mean value for x which is approximately 4.

According to a preferred embodiment of the invention, the hydrophobing agent is chosen from octenyldimethylchlorosilane, bis(3-triethoxysilylpropyl)tetrasulphide and their mixture.

According to the invention, one of the alkoxy groups or the halogen atom carried by the silane will react with a silanol group present at the surface of the silica, when the filler according to the invention is silica.

Preferably, the hydrophobing agent, once attached to the filler, comprises at most 30 carbon atoms and more particularly from 1 to 25 carbon atoms.

Hydrophobized filler is understood to mean, within the meaning of the present invention, a filler which carries sufficient hydrophobing agents to make possible the spontaneous coagulation of the filler with the elastomer.

Preferably, the hydrophobized filler is characterized by a degree of hydrophobation of greater than or equal to 0.29 carbon atom carried by the hydrophobing agent, once attached to the filler, per $nm^2$ of filler surface area.

Preferably, the degree of hydrophobation is between 0.29 and 0.73 carbon atom/$nm^2$ of surface area.

The BET specific surface of a filler is generally measured in a way known per se according to the Brunauer-Emmett-Teller method described in "*The Journal of the American Chemical Society*", Vol. 60, page 309, February 1938, corresponding to Standard ISO 5794/1.

Preparation of the Aqueous Filler Dispersion (B)

The filler or fillers according to the invention, in particular the carbon black in association with at least one surfactant, are subsequently dispersed in water, preferably so as to obtain a dispersion having a viscosity sufficient to be able to be easily handled.

Advantageously, the dispersion is subjected to ultrasound in order to make it possible to obtain stability of the aggregates in water, which makes it possible to improve the dispersibility of the aqueous filler dispersion in the masterbatch subsequently produced.

This sonication can in particular be carried out using a Vibracell generator manufactured by Sonics and Materials Inc. of 1500 watts with a piezoelectric converter with a PZT crystal (reference 75010), a booster for the probe and a probe made of titanium alloy with a diameter of 19 mm (for a height of 127 mm).

The concentration of fillers in the aqueous dispersion (B) comprising the fillers is preferably between 0.1% and 20% by weight, preferably between 1% and 15% by weight, with respect to the water present in the aqueous filler dispersion (B).

Bringing the Two Dispersions into Contact

The latex of the diene elastomer (A) and the filler dispersion (B) are brought into contact. The filler slurry is slowly poured into the elastomer latex, or vice versa, with stirring, preferably slow stirring, so as to ensure good homogenization of the medium. The simultaneous mixing together of the dispersions (A) and (B) with a controlled flow rate can also be envisaged.

It is possible to use any type of device which makes possible efficient mixing of two products in the liquid phase; thus, it will be possible to use a static mixer, such as those sold by Noritake Co. Limited, TAH in the USA, Koflo in the USA or Tokushu Kika Kogyo Co. Ltd, or a mixer which produces high shear, such as mixers sold by Tokushu Kika Kogyo Co. Ltd, by PUC in Germany, by Cavitron in Germany or by Silverson in the United Kingdom.

During the coagulation of these two dispersions, a coagulum of elastomer and of filler is formed, either in the form of just one solid component in the solution or in the form of several separate solid components.

The volume of aqueous dispersion of the filler (B) depends on the filler content targeted for the masterbatch to be produced, on the volume of the diene elastomer latex (A) and on their respective concentrations.

Thus, the volume will consequently be adjusted. Advantageously, the filler content targeted for the masterbatch is between 10 and 150 phr, preferably between 10 and 100 phr, more preferably between 15 and 90 phr and more preferably still between 15 and 70 phr.

Preferably, the process according to the invention does not comprise the addition of a coagulating agent.

According to another embodiment, it is possible to add one or more coagulating agents to the dispersions (C), so as to improve the yield of the coagulation stage. Should this happen, the coagulating agent is not the factor responsible for the triggering of the coagulation.

Recovery of the Solid Form

The solid or solids are recovered, for example, by filtration or by centrifuging. This is because the filtering operation, which can be carried out using a filtration sieve, may prove to be unsuitable when the coagulum exists in the form of numerous small solid components. In such a case, an additional centrifuging operation is preferably carried out.

On conclusion of this recovery stage, the coagulum obtained is dried, for example in an oven.

The process according to the invention can be carried out both continuously and batchwise.

Additives

The diene elastomer latex (A) in accordance with the invention and the aqueous filler dispersion (B) in accordance with the invention can also comprise all or a portion of the usual additives generally used in elastomer compositions intended for the manufacture of tyres, in particular treads, such as, for example, plasticizers or extending oils, whether the latter are aromatic or nonaromatic in nature, pigments, protection agents, such as antiozone waxes, chemical antiozonants, antioxidants, antifatigue agents, reinforcing resins, methylene acceptors (for example phenolic novolak resin) or methylene donors (for example, HMT or H3M), such as are described, for example, in Application WO 02/10269, a crosslinking system based either on sulphur or on sulphur donors and/or on peroxides and/or on bismaleimides, vulcanization accelerators or vulcanization activators, with the exception, of course, of zinc-based activators (or in accordance with the 0.5 phr maximum for zinc in the composition, and preferably less than 0.3 phr).

Preferably, these dispersions comprise, as preferred nonaromatic or very slightly aromatic plasticizing agent, at least one compound chosen from the group consisting of naphthenic oils, paraffinic oils, MES oils, TDAE oils, glycerol esters (in particular trioleates), plasticizing hydrocarbon resins exhibiting a high Tg preferably of greater than 30° C., and the mixtures of such compounds.

The additives described above might also be incorporated in the masterbatch after the formation of the coagulum.

It is also possible to add, to the medium, after coagulation, coupling agents, coupling activators, covering agents for the reinforcing inorganic filler or more generally processing aids capable, in a known way, by virtue of an improvement in the dispersion of the inorganic or organic filler in the rubber matrix and of a lowering of the viscosity of the compositions, of improving their property of processing in the raw state, these agents being, for example, hydrolyzable silanes, such as alkylalkoxysilanes (in particular alkyltriethoxysilanes), polyols, polyethers (for example polyethylene glycols), primary, secondary or tertiary amines (for example trialkanolamines), hydroxylated or hydrolyzable POSs, for example α,ω-dihydroxypolyorganosiloxanes (in particular α,ω-dihydroxypolydimethylsiloxanes), fatty acids, such as, for example, stearic acid, and reinforcing fillers other than those described above, such as carbon black.

The invention also relates to a masterbatch of diene elastomer and of filler prepared according to the process described above.

Another subject-matter of the invention is a rubber composition based on at least one masterbatch of diene elastomer and of filler prepared according to the process described above.

The rubber compositions of the invention are manufactured in appropriate mixers using two successive preparation phases according to a general procedure well known to a person skilled in the art: a first phase of thermomechanical working or kneading (sometimes described as "non-productive" phase) at high temperature, up to a maximum temperature of between 130° C. and 200° C., preferably between 145° C. and 185° C., followed by a second phase of mechanical working (sometimes described as "productive" phase) at a lower temperature, typically of less than 120° C., for example between 60° C. and 100° C., finishing phase during which the crosslinking or vulcanization system is incorporated.

According to a preferred embodiment of the invention, all the base constituents of the compositions of the invention, with the exception of the vulcanization system, namely the masterbatch, and optional additives of the masterbatch, if appropriate, are intimately incorporated, by kneading, in the diene elastomer during the first "non-productive" phase, that is to say that at least these various base constituents are introduced into the mixer and are thermomechanically kneaded, in one or more stages, until the maximum temperature of between 130° C. and 200° C., preferably of between 145° C. and 185° C., is reached.

By way of example, the first (non-productive) phase is carried out in a single thermomechanical stage during which all the necessary constituents, the optional additional covering agents or processing aids and various other additives, with the exception of the vulcanization system, are introduced into an appropriate mixer, such as a normal internal mixer. The total duration of the kneading, in this non-productive phase, is preferably between 1 and 15 min. After cooling the mixture thus obtained during the first non-productive phase, the vulcanization system is then incorporated at low temperature, generally in an external mixer, such as an open mill; the combined mixture is then mixed (productive phase) for several minutes, for example between 2 and 15 min.

The vulcanization system proper is preferably based on sulphur and on a primary vulcanization accelerator, in particular on an accelerator of the sulphenamide type. Various known vulcanization activators or secondary vulcanization accelerators, with the exception of zinc and any zinc derivative, such as ZnO, or while observing a zinc content of the composition of less than 0.5 phr, preferably of less than 0.3 phr, such as, for example, fatty acids, such as stearic acid, guanidine derivatives (in particular diphenylguanidine), and the like, incorporated during the first non-productive phase and/or during the productive phase, can be additional to this vulcanization system. The sulphur content is preferably between 0.5 and 3.0 phr and the content of the primary accelerator is preferably between 0.5 and 5.0 phr.

The final composition thus obtained is subsequently calendared, for example in the form of a sheet or of a plaque, in particular for a laboratory characterization, or also extruded in the form of a rubber profiled element which can be used, for example, as a tyre tread for a passenger vehicle.

The invention also relates to a masterbatch of diene elastomer and of filler prepared according to the process described above.

The invention also relates to a rubber composition based on at least one masterbatch of the diene elastomer and of filler prepared according to the process described above.

The invention also relates to a finished or semifinished article comprising a composition as defined above.

The invention also relates to a tyre tread comprising a composition as defined above.

Finally, a subject-matter of the invention is a tyre or semifinished product provided with at least one rubber composition as defined above.

The following examples serve to illustrate the invention without, however, exhibiting a limiting nature.

EXAMPLES

Equipment Used

Model VCX500 Bricel ultrasound generator (ref. Fisher W75043) with a power of 500 W, used at 60% of its maximum power.

Standard sonication probe having a diameter of 13 mm, suitable for the sonication of volumes of between 10 and 250 ml (ref. Fisher 75482).

One magnetic stirrer plus one magnetic bar.

Glassware: beaker with a size of 15 ml (ref. VWRN 15 ml 213-3916) or 500 ml (ref. VWR 50 ml 212-9301).

Reactant: high ammonia natural rubber latex comprising 60% by weight of natural rubber originating from Trang Latex Co. Ltd, Thailand.

Silica powder ground with a mortar, Zeosil silica 1165MP from Rhodia, with a BET specific surface: 160 m$^2$/g, Distilled water.

Preparation of the Hydrophobized Silica

The silica is ground to give a fine powder using a pestle and mortar. The hydrophobicity of the silica is adjusted by silanization of its surface with octenyldimethylchlorosilane (ODCS).

The hydrophobized silica is prepared by reacting 5 g of hydrophilic silica with various amounts of ODCS in the presence of 50 g of toluene (see the table for compositions 1 and 2 below).

The necessary amounts of ODCS are dissolved in toluene. The medium is stirred using a magnetic stirrer. The ground silica powder is added to the medium and the dispersion is left stirring for 2 minutes. The composition is placed in a Petri dish (with a diameter of 18.5 cm) and is placed at a temperature of 70° C. for one hour, so as to make possible the evaporation of the toluene. The powder obtained is dispersed in distilled water after sonication for two minutes.

|  | 1 | 2 |
| --- | --- | --- |
| Silica in g | 5 | 5 |
| ODCS in g | 0.15 | 0.20 |
| Toluene | 50 g | 50 g |
| Nb C atom/nm$^2$ | 0.55 | 0.73 |

Masterbatches Prepared

The masterbatches are prepared according to a process in accordance with the invention and in the following way.

Preparation of the Aqueous Dispersion A of Natural Rubber Latex

The natural rubber latex is weighed out into a glass beaker, a magnetic bar is added thereto and the latex is subsequently diluted in distilled water down to a concentration of 60% by weight of natural rubber.

Preparation of the Aqueous Filler Dispersion B 2.32 g of the hydrophobized silica prepared according to compositions 1 and 2 described above are dispersed in 20 ml of water. The combined mixture is then homogenized using an ultrasound probe for two minutes. The silica agglomerated on the probe at the end of the two minutes is incorporated in the mixture using a spatula.

Preparation of the Masterbatch 3.3 g of aqueous dispersion (B) are introduced into a 15 ml beaker and then 3.3 g of the aqueous dispersion (A) are added thereto. The mixture is mixed using the magnetic stirrer at a speed of 700 rpm. This operation is carried out for each of the aqueous dispersions (B) prepared from compositions 1 and 2.

Conclusion

It was observed that, for each of compositions 1 and 2, the coagulation between the hydrophobized reinforcing inorganic filler and the latex takes place spontaneously.

The invention claimed is:

1. Process for the preparation of a masterbatch of diene elastomer and reinforcing inorganic filler comprising the following successive stages: bringing into contact and mixing one or more aqueous dispersions (B) of one or more hydrophobized reinforcing inorganic fillers, which coagulate(s) spontaneously with the said latex, and one or more diene elastomer latexes (A) in order to obtain a coagulum, without requiring a coagulating agent, recovery of the coagulum, then drying the recovered coagulum in order to obtain the masterbatch.

2. Process according to claim 1, wherein recovery of the coagulum is carried out by a filtering operation.

3. Process according to claim 1, wherein recovery of the coagulum is carried out by a centrifuging operation.

4. Process according to claim 1, wherein the diene elastomer latex is a natural rubber latex.

5. Process according to claim 4, characterized in that the diene elastomer latex is a concentrated natural rubber latex.

6. Process according to claim 1, wherein the filler is chosen from silica (SiO$_2$), alumina (Al$_2$O$_3$), alumina monohydrate (Al$_2$O$_3$.H$_2$O), aluminum hydroxide [Al(OH)$_3$], aluminum carbonate [Al$_2$(CO$_3$)$_3$], magnesium hydroxide [Mg(OH)$_2$], magnesium oxide (MgO), magnesium carbonate (MgCO$_3$), talc (3MgO.4SiO$_2$.2.H$_2$O), attapulgite (5MgO.8SiO$_2$. 9H$_2$O), titanium dioxide (TiO$_2$), titanium black (TiO$_{2n-1}$), calcium oxide (CaO), calcium hydroxide [Ca(OH)$_2$], aluminum magnesium oxide (MgO.Al$_2$O$_3$), clay (Al2O$_3$.2SiO$_2$), kaolin (Al$_2$O$_3$.2SiO$_2$.2H$_2$O), pyrophyllite (Al$_2$O$_3$.4SiO$_2$.H$_2$O), bentonite (Al$_2$O$_3$.4SiO$_2$.2H$_2$O), aluminum silicate (Al$_2$SiO$_5$.Al4(SiO$_4$)$_3$.5H$_2$O), magnesium silicate (Mg$_2$SiO$_4$.MgSiO$_3$), calcium silicate (Ca$_2$SiO$_4$), aluminum calcium silicate (Al$_2$O$_3$.CaO.2SiO$_2$), calcium magnesium silicate (CaMgSiO$_4$), calcium carbonate (CaCO$_3$), zirconium oxide (ZrO$_2$), zirconium hydroxide [ZrO(OH)$_2$.nH$_2$O], zirconium carbonate [Zr(CO$_3$)$_2$], and crystalline aluminosilicates comprising atoms of hydrogen compensating for the charges, alkali metals or alkaline earth metals, and mixtures thereof.

7. Process according to claim 6, wherein the filler is silica (SiO$_2$).

8. Process according to claim 1, wherein the filler is hydrophobized using one or more hydrophobing agents of following formula (I):

$$E_n\text{-}F \qquad \text{(Formula I)}$$

in which:
n is an integer equal to 1 or 2,
when n has the value 1, then F is a monovalent group,
when n has the value 2, then F is a divalent group,
E represents a functional group which is capable of bonding physically and/or chemically to the filler and which comprises, in its structure, at least one alkyl or alkylene chain comprising from 1 to 18 carbon atoms which confers hydrophobing properties on the group E,
F represents a group which may or may not bond physically and/or chemically to the diene elastomer.

9. Process according to claim 8, wherein the hydrophobing agent is of following formula (II):

$$[G_{(3-m)}(L\text{-}K)_m\text{Si-}L\text{-}]_n\text{-}F \qquad \text{(II)}$$

with:
when n has the value 1, then F denotes the K group defined below and m varies from 0 to 2, and when n has the value 2, then F denotes an amino group, a polysulphide ($S_x$) group or an epoxy group and m varies from 0 to 2, and for which the G groups are chosen, independently of one another, from a hydrogen atom, a $C_1$-$C_{18}$ hydrocarbon group chosen from linear, branched or cyclic alkyl groups, aralkyl groups, alkylaryl groups and aryl groups, an alkoxy ($R_1O$)— group, in which $R_1$ represents a saturated $C_1$-$C_8$ alkyl radical, a halogen atom, and a hydroxyl group, provided that at least one G group is chosen from an alkoxy group, a chlorine atom or a hydroxyl group, L denotes a saturated or unsaturated and linear, branched or cyclic $C_1$-$C_{18}$ alkylene radical, optionally comprising an oxygen atom, K denotes a hydrogen atom, a halogen atom, or a functional group chosen from an amino group, a polyaminoalkyl group, a mercapto group, an epoxy group, a hydroxyl group, a vinyl group, an acryloyloxy group, a methacryloyloxy group, an —SCN group or an R(CO)S— group with R being a $C_1$-$C_{18}$ alkyl group.

10. Process according to claim 9, wherein m=0.

11. Process according to claim 10, wherein the hydrophobing agent is of following formula (III):

$$G_3Si\text{-}L\text{-}K \quad (III)$$

12. Process according to claim 10, wherein the hydrophobing agent is of following formula (IV):

$$[G_3Si\text{-}L\text{-}]_2\text{-}F \quad (IV).$$

13. Process according to claim 8, wherein the hydrophobing agent is chosen from chlorotrimethylsilane, chlorotriethylsilane, chlorotripropylsilane, bromotrimethylsilane, bromotriethylsilane, bromotripropylsilane, fluorotrimethylsilane, methoxytrimethylsilane, methoxytriethylsilane, methoxytripropylsilane, chlorotrimethylsilane, dichlorodimethylsilane, trichloromethylsilane, bromotrimethylsilane, dibromodimethylsilane, tribromomethylsilane, methoxytrimethylsilane, dimethoxydimethylsilane, trimethoxymethylsilane, tetramethoxysilane, trimethoxypropylsilane, trimethoxyoctylsilane, trimethoxyhexadecylsilane, dimethoxydipropylsilane, triethoxymethylsilane, triethoxypropylsilane, triethoxyoctylsilane, diethoxydimethylsilane, octenyldimethylchlorosilane, octadecyltrichlorosilane, (γ-aminopropyl)trimethoxysilane, (γ-aminopropyl)triethoxysilane, (γ-hydroxypropyl)tripropoxysilane, (γ-mercaptopropyl)triethoxysilane, (γ-aminopropyl)dimethylethoxysilane, (γ-aminopropyl)dihydroxymethoxysilane, (glycidylpropyl)trimethoxysilane, [γ-(N-aminoethyl)aminopropyl]triethoxysilane, (γ-methacryloyloxypropyl)triethoxysilane, (γ-methacryloyloxypropyl)trimethoxysilane, (β-mercaptoethyl)triethoxysilane, [γ-(N-aminoethyl)aminopropyl]trimethoxysilane, (N-methylaminopropyl)trimethoxysilane, (γ-thiocyanatopropyl)triethoxysilane, bis-(3-triethoxythiopropyl)silane tetrasulphide, vinyltriethoxysilane, vinylphenylmethylsilane, vinyldimethylmethoxysilane, divinyldimethoxysilane, divinylethyldimethoxysilane, dimethylvinylchlorosilane, bis(3-triethoxysilylpropyl)tetrasulphide and mixtures thereof.

14. Process according to claim 8, wherein the hydrophobing agent, once attached to the filler, comprises at most 30 carbon atoms.

15. Process according to claim 8, wherein the hydrophobing agent is selected from octenyldimethylchlorosilane, bis(3-triethoxysilylpropyl)tetrasulphide and mixtures thereof.

16. Process according to claim 8, wherein the hydrophobized filler has a degree of hydrophobation of greater than or equal to 0.29 carbon atom carried by the hydrophobing agent, once attached to the filler, per nm2 of filler surface area.

17. Process according to claim 1, wherein the process does not use a coagulating agent.

18. Process according to claim 9, wherein aryl groups are chosen from a phenyl and a benzyl group.

19. Process according to claim 9, wherein cyclic alkyl groups are chosen from a cyclopentyl and a cyclohexyl group.

20. Process according to claim 9, wherein the $C_1$-$C_8$ alkyl radical is chosen from methyl, ethyl and isopropyl groups.

21. Process according to claim 9, wherein the $C_1$-$C_8$ alkyl radical is chosen from at least one methyl and ethyl group.

22. Process according to claim 9, wherein the halogen atom is chosen from fluorine, chlorine, bromine and iodine.

23. Process according to claim 9, wherein $C_1$-$C_{18}$ alkylene radical is of 1 to 8 carbon atoms.

24. Process according to claim 9, wherein $C_1$-$C_{18}$ alkylene radical is chosen from the methylene, ethylene, isopropylene, n-butylene, octadecylene, cyclopentylene and cyclohexylene groups.

* * * * *